UNITED STATES PATENT OFFICE.

FREDERIC P. DEWEY, OF WASHINGTON, DISTRICT OF COLUMBIA.

PROCESS OF TREATING MIXTURES CONTAINING SULPHIDES.

SPECIFICATION forming part of Letters Patent No. 490,068, dated January 17, 1893.

Application filed September 6, 1892. Serial No. 445,206. (No specimens.)

*To all whom it may concern:*

Be it known that I, FREDERIC P. DEWEY, a citizen of the United States, residing at Washington, in the District of Columbia, have invented certain new and useful Improvements in Processes of Treating Mixtures Containing Sulphides; and I do hereby declare that the following is a full, clear, and exact description thereof.

The object of my invention is to provide an improved process of treating mixtures containing sulphides of precious metals and of copper, whereby the precious metals can be easily and cheaply obtained free from copper, and, to this end my invention consists in the process and the parts thereof, as hereinafter specified.

The special purpose, which I have had in view in inventing my said process, has been the treatment of the mixtures of sulphides, such as are usually obtained, by precipitation, from the solution resultant from the treating of ores of precious metals by lixiviation with a solvent solution; but I desire it to be understood that my invention, can also, be used advantageously, on other mixtures of sulphides of the precious metals. Generally, when the solution resultant from the lixiviation is treated to precipitate the metals in the form of sulphides, the mixture contained in the precipitate consists of sulphides of gold, silver, copper and lead, and free sulphur, with some impurities in small amounts. The proportions of the different sulphides in the precipitate vary, but, usually, there is from a trace to one per cent of gold, from five to seventy per cent of silver, from five to twenty per cent of copper, and nothing to fifteen per cent of lead. The treatment of such mixture of sulphides, to separate and recover the precious metals therefrom, has been found to be difficult and expensive, because of the presence of the copper, which it is very hard to separate from the gold and silver.

The methods heretofore used for the separation and recovery of the precious metals have been costly, and often greatly objectionable, because of the cost of fuel required for the roasting and melting of the metals with lead, which they involved, and the loss of precious metals by volatilization, which the high heats used in carrying such methods out was apt to cause.

My purpose has been to do away with all necessity for roasting or melting, to secure the separation and refining of the precious metals, and with this purpose I have devised the entirely liquid process hereinafter described.

The first step of such process consists in subjecting the sulphide mixture, in a suitable pot or kettle, to the action of heated sulphuric acid; which, being a hydric sulphate, is adapted, in its concentrated form, to convert the sulphides into sulphates. In practice, the acid marking 50° Baumé, or more, is poured over the mass of sulphides in the kettle, and then is heated up by means of a steam coil, or otherwise, as desired. The amount of acid will vary with the varying percentages of silver and copper in the sulphides.

Where the process is used on what are known as Russell sulphides, containing usually a little gold, thirty per cent of silver, twenty per cent of copper, and small amounts of impurities, I use a quantity of the acid of 66° Baumé, equal to about twice the weight of the sulphides. Heat is then applied to the contents of the kettle, with frequent stirring. This is continued until the dark color of all of the sulphides, has disappeared. With a moderate heat, the reaction is as follows;—

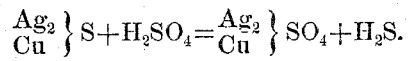

The metallic sulphides are transformed into sulphates, and sulphureted hydrogen is evolved. As the heat is continued, water is driven off and the acid becomes stronger, so that there is the decomposition represented by the formula

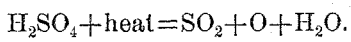

The $SO_2+O$, produced by this decomposition, reacts upon the $H_2S$, evolved by the first reaction, as follows:—

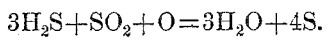

Such reaction involves the oxidizing of the hydrogen to water, and the separation of sulphur in its elemental condition.

In order to avoid the oxidizing of the sulphur, which would take place were the heat raised, to produce a rapid decomposition of the sulphuric acid into $SO_2+O+H_2O$, I prefer to use a lower heat, sufficient to cause the second and third of the reactions, above indicated, to take place. I thus economize in the acid used, as well as in the means for heating.

If the temperature is carefully regulated and kept low enough, all the sulphur combined with the silver and copper, may be driven off as sulphureted hydrogen; but I prefer to use the higher degree of heat, which will cause the second and third reactions to take place, as the operation is quicker and more easily carried on, without so much care being needed.

As the heat is applied to a charge of sulphides with the sulphuric acid, to raise it to the required temperature, the first, second, and third reactions will take place so rapidly, that the final reaction can be expressed as follows:—

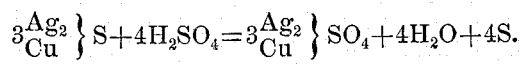

The result of the described treatment with hot, strong sulphuric acid, is, that the metallic sulphides are converted into sulphates, of which the sulphate of silver produced is readily soluble in the hot strong acid, and, consequently, goes into solution;—while the sulphates of copper and lead, being, practically, insoluble in such acid, are precipitated and would remain as a residue in the pot or kettle, if the acid solution of sulphate of silver should be drawn or siphoned off.

In another application for United States Patent filed by me, Serial No. 445,207, I describe and claim a process, in the carrying out of which, the solution is so drawn off, as to leave the sulphate of copper with the sulphate of lead, as a residue, and the latter is afterward treated to remove the copper sulphate;—but in the carrying out of the process covered by this application, I prefer, in order that the quantity of sulphate of copper produced by the final precipitation of the silver, may be as great as possible, to remove the entire contents of the kettle to a suitable tank containing water, which is sufficiently acidulated to keep the sulphate of silver in solution. This water serves to bring the sulphate of copper also into solution. After the addition of the water, the solution of sulphates of silver and copper, is separated from the gold and sulphate of lead, by siphoning, or drawing off, or filtering, and is run into a lead lined tank, that can be kept hot. Here the silver is precipitated, as a metal, by the introduction of copper plates into the liquid, and is then removed, sweetened, and melted. The copper sulphate is then recovered by crystallization, and the mother liquor is concentrated to 50° Baumé, or more, as desired, and is ready for re-use in the dissolving kettle, in the first step of the process. The residue, remaining after the filtering or drawing off of the silver and copper sulphate containing solution, is melted with suitable oxidizing fluxes, so as to yield fine gold.

It will be observed that, in carrying out my invention, I avoid the use of high dry heats, which would involve great expense for fuel, and the loss of precious metals by volatilization;—and, by the employment of an entirely liquid process, requiring only a moderate heat, readily and effectually secure the separation of the silver and gold from the copper, the last named metal being recovered from the sulphides in a valuable form, the sulphate. It will also be seen that the quantity of this desirable copper salt which would be obtained from the sulphides alone, is, where the sulphates of silver and copper are drawn off together in solution before precipitation, increased by an amount corresponding to the amount of silver in the sulphide mixture treated.

In some cases, particularly where large quantities of lead are present, I contemplate giving the residue, after the first drawing off of the solution, a second boiling in strong sulphuric acid, to completely take out the silver. The resultant solution can be added to the first one in the precipitating tank, or treated separately, to precipitate the silver therefrom.

Having thus described my invention, what I claim is—

1. The process of treating mixtures containing sulphides of silver and copper, for the purpose of converting such metals into sulphates without oxidation of the sulphur, which process consists in subjecting the mixture to the action of a sulphate, at a temperature below that at which the sulphur is oxidized, substantially as specified.

2. The process of treating mixtures containing sulphides of silver and copper, for the purpose of converting such metals into sulphates without oxidation, which process consists in subjecting the mixture to the action of sulphuric acid at a temperature below that at which the sulphur is oxidized, substantially as specified.

3. The process of treating mixtures containing sulphides of silver and copper, which consists in heating the sulphides with strong sulphuric acid, to convert the sulphides of silver and copper into sulphates and get the sulphate of silver into solution, adding water, to get the sulphate of copper also into solution, and then separating any insoluble residue from the resultant solution containing both of the sulphates, substantially as described.

4. The process of treating mixtures containing sulphides of silver and copper, which consists in heating the sulphides with strong sulphuric acid, to convert the sulphides into sulphates and dissolve the silver sulphate, adding water to the acid, to bring the sulphate of copper also into solution separating the resultant solution from any insoluble precipitate, and then precipitating the silver from the solution, substantially as described.

5. The process of treating mixtures containing sulphides of silver and copper, which consists in heating the sulphides with strong sulphuric acid to convert the sulphides into sulphates and dissolve the sulphate of silver, adding water, to bring the sulphate of copper also into solution drawing off the resultant solution, precipitating the silver therefrom by metallic copper, and recovering the sulphate of copper from the remaining solution, substantially as described.

In testimony that I claim the foregoing I have hereunto set my hand this 6th day of September, 1892.

FREDERIC P. DEWEY.

Witnesses:
CHAS. H. MILLER.
CHARLES EARL.